United States Patent [19]

Belanger

[11] Patent Number: 4,967,440
[45] Date of Patent: Nov. 6, 1990

[54] ROTARY CLOTH ROLL ASSEMBLY
[75] Inventor: James A. Belanger, Northville, Mich.
[73] Assignee: Belanger, Inc., Northville, Mich.
[21] Appl. No.: 233,640
[22] Filed: Aug. 19, 1988

Related U.S. Application Data

[63] Continuation-in-part of Ser. No. 209,669, Jun. 21, 1988, and a continuation-in-part of Ser. No. 067,999, Jun. 29, 1987, abandoned.

[51] Int. Cl.⁵ ............................................. B60S 3/00
[52] U.S. Cl. .............................. 15/230.14; 15/53 B; 15/97 B; 15/DIG. 2; 15/53.4; 15/97.3
[58] Field of Search ........... 15/230.14, 230.12, 230.16, 15/230.17, 97 R, 97 A, 97 B, 181, DIG. 2, 102, 230, 230.19, 53 B; 51/332, 334, 358, 168, 381

[56] References Cited

U.S. PATENT DOCUMENTS

| | | |
|---|---|---|
| 1,189,798 | 7/1916 | Dillon . |
| 1,217,848 | 2/1917 | Small . |
| 1,753,201 | 4/1930 | Edlich . |
| 1,799,808 | 4/1931 | Bartling ............................ 15/230.16 |
| 2,455,099 | 11/1948 | Seelenfreund . |
| 2,455,680 | 12/1948 | Kaplan . |
| 2,476,537 | 7/1949 | Erickson . |
| 2,539,844 | 1/1951 | Kingsbury . |
| 2,643,493 | 6/1953 | Zimmerman ..................... 15/230.16 |
| 3,067,444 | 12/1962 | Dickson et al. . |
| 3,346,895 | 10/1967 | Consolo . |
| 3,724,140 | 4/1973 | Harper ..................... 51/332 |
| 3,733,062 | 5/1973 | Barcich .................. 261/DIG. 15 X |
| 3,774,259 | 11/1973 | Genaro . |
| 3,823,922 | 7/1974 | McElreath .................. 261/DIG. 15 |
| 3,842,547 | 10/1974 | Belanger .................. 51/334 |
| 3,991,526 | 11/1976 | Frank et al. . |

FOREIGN PATENT DOCUMENTS 497422 11/1953 Canada .
814990 6/1959 United Kingdom ............. 15/230.16

Primary Examiner—Harvey C. Hornsby
Assistant Examiner—Stephen F. Gerrity
Attorney, Agent, or Firm—Dykema Gossett

[57] ABSTRACT

A rotary cloth roll assembly for treating the surfaces of the tires on one side of an automobile as it proceeds along a predetermined path of travel comprises a rotary shaft having a longitudinal axis parallel to the path of travel, a positive stop abutment secured to the shaft and a plurality of aligned replaceable cartridges mounted upon the shaft for rotation therewith and bearing against the abutment. Each cartridge includes a series of engaging spacers, with each spacer having at its center an opening generally conforming to the shaft for rotation therewith and for preventing rotation of the spacers relative to the shaft. Each spacer has first and second sides, the first side being generally flat and the second side having thereon a plurality of spaced disc support projections. A series of flexible non-woven cloth discs of synthetic fibers are disclosed, each disc having at its center a non-circular opening with a plurality of radial notches conforming to the projections of the spacers for assembly upon each of the spacer projections respectively and rotation therewith and for preventing rotation of the discs relative to the spacers. A removable fastening means on the shaft secures the spacers to the shaft and for securing the flexible discs between the spacers. The invention further includes the method of making a cloth roll cartridge and the method of cleaning an automobile tire.

13 Claims, 3 Drawing Sheets

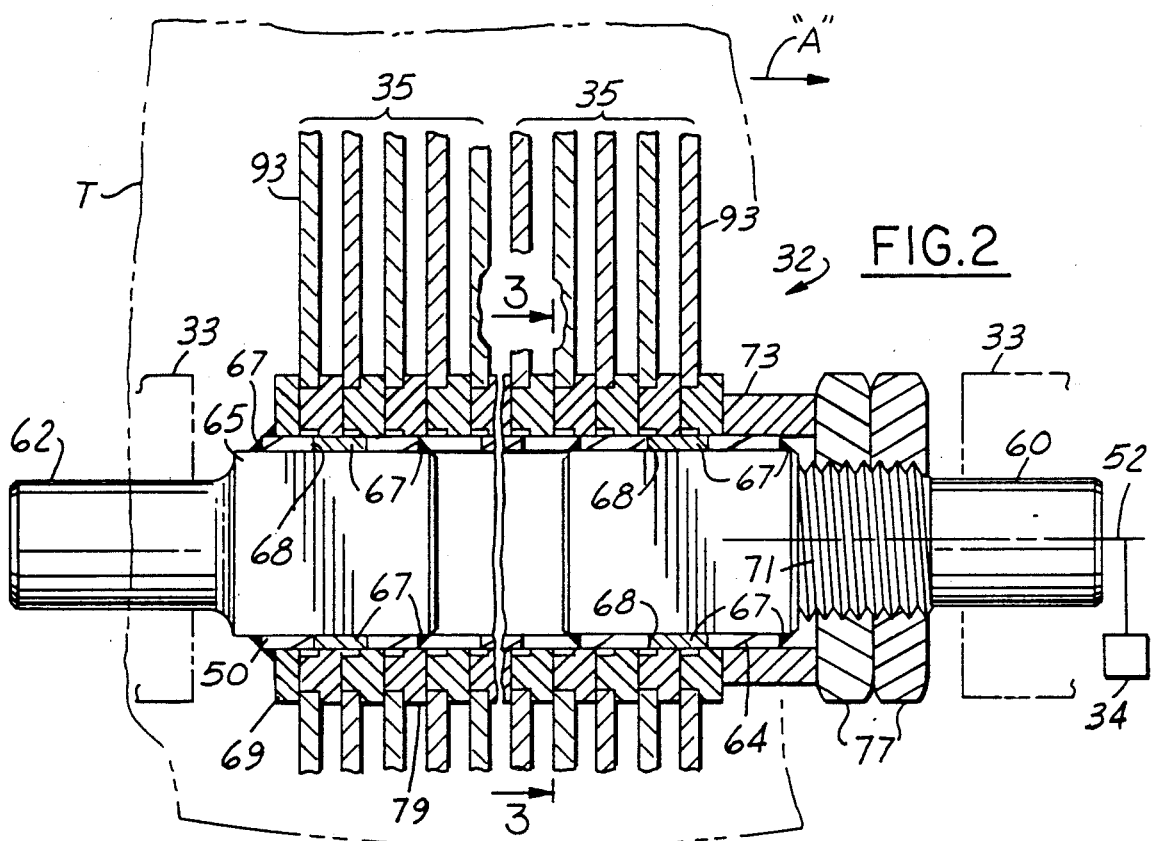
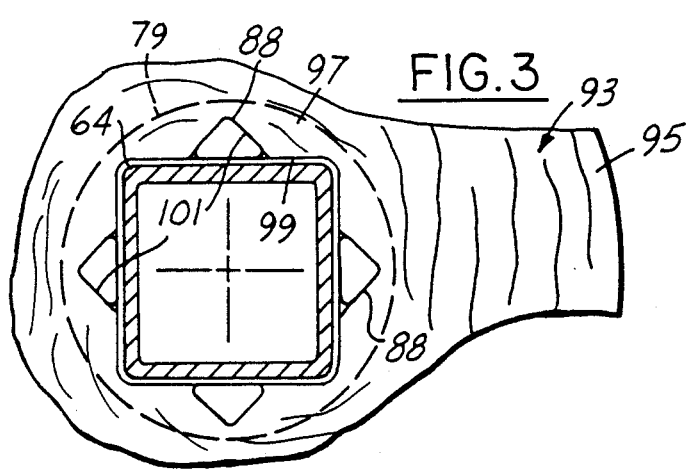
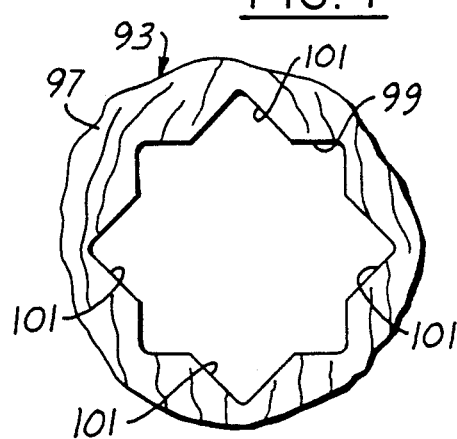
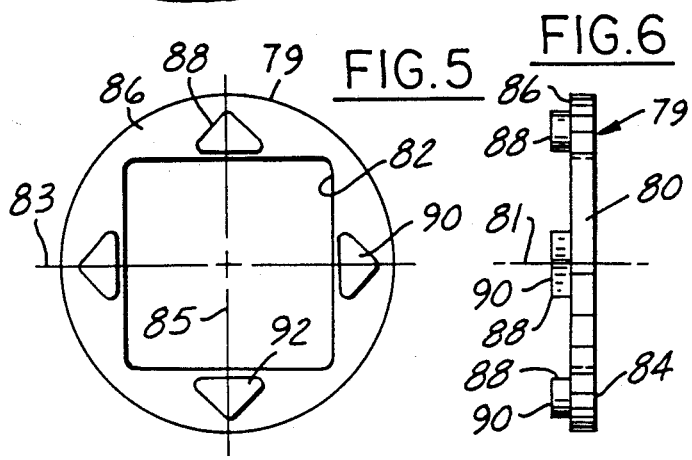
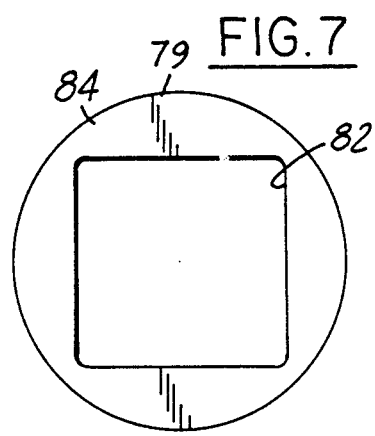

ROTARY CLOTH ROLL ASSEMBLY

RELATED APPLICATION

This application is a continuation-in-part application of my copending patent application Ser. No. 209,669, entitled "Rotary Cloth Roll Assembly," filed June 21, 1988, and assigned to the assignee of record and of my copending patent application Ser. No. 067,999, entitled "Rotary Repackable Cloth Wheel Assembly," filed June 29, 1987 (now abandoned), and also assigned to the assignee of record.

TECHNICAL FIELD

This invention relates to a rotary cloth roll assembly and more particularly to an improved rotary cloth roll assembly using a plurality of replaceable unit cartridges having non-woven cloth discs of synthetic fibers.

BACKGROUND OF THE INVENTION

My latest filed copending patent application relates to a rotary cloth roll assembly which includes a series of aligned replaceable unit cloth roll cartridges, with each cartridge including a plurality of contacting spacers and a plurality of flexible non-woven cloth discs of synthetic fiber material mounted upon each spacer. A stop abutment is secured to the shaft adjacent one end retainingly engaging the cartridges. On the other end of the shaft, there is employed a fastening means for securing the aligned assembled cartridges to and along the shaft. The respective spacers in each cartridge have generally rectangular-shaped openings to fit upon the shaft, with each spacer having a non-circular mount shoulder. Likewise, the respective non-woven cloth discs have similar openings for mounting and anchoring upon the corresponding shoulders so that the individual spacers are secured to the shaft for rotation therewith and are constrained against rotation relative to the shaft.

From time to time as the respective cloth disc of one or more cartridges show signs of wear, the complete cloth wheel assembly is disassembled and the worn cartridge replaced by another cloth cartridge with the roll reassembled for further use.

SUMMARY OF THE INVENTION

An important feature of the present invention is to provide an improved rotary cloth roll assembly for treating the surfaces of the tires on one side of an automobile as it proceeds along a predetermined horizontal path of travel. Upon an elongated shaft and retained thereon there are provided a series of aligned improved replaceable cloth roll cartridges as units. Each cartridge includes a series of engaging spacers and with a plurality of flexible non-woven cloth discs non-rotatively mounted upon the spacers and rotatable therewith. In the event that some of the cloth discs of a particular cartridge become worn or damaged, the entire cartridge is easily removed from the shaft and replaced with an available new cartridge with a great saving of time, expense and shut-down time.

In my latest filed copending patent application, the respective spacers as well as the discs were all mounted upon the shaft, with one or more cloth discs mounted upon each spacer. The central apertures of the spacers are non-circular for registry with a correspondingly shaped shaft. A drive relation was established between the shaft and the spacers, and with the cloth discs mounted upon the spacers, and at the same time preventing relative rotation of the spacers and discs with respect to the shaft.

As another feature in the present cartridge construction, a plurality of such unit cartridges are made and stored as replacement cartridges as required from time to time without necessitating replacement of individual discs.

As an important feature for the row of cartridges adapted for positioning upon an elongated rotatable shaft, there is provided a positive stop abutment upon the shaft. A series of centrally apertured unit cartridges are assembled onto the shaft and retained in position thereon and for rotation therewith. There is also provided a series of engaging spacers for each cartridge. Each spacer has an opening generally conforming to the cross-sectional shape of the shaft and with a suitable means interposed between the shaft and spacers for preventing rotation of the spacers relative to the shaft. A series of flexible non-woven cloth discs of a synthetic fiber material are mounted singly or in groups upon the support projections of the respective spacers and anchored thereon against relative movement.

As another feature, for each cartridge and for the series of aligned engaging spacers therein arranged end to end, each spacer has at its center an opening which generally conforms to the cross-section of a portion of the shaft and wherein a portion of the shaft and the corresponding openings within the spacers are non-circular or polygonal such that there is a drive relationship between the shaft and the cartridge including the respective connected spacers.

As another feature, each spacer has first and second sides with the first side being generally flat and with the second side having thereon and extending axially therefrom a plurality of spaced disc locating and support projections, with each projection having a generally flat surface parallel to the first side. The respective flexible non-woven cloth discs, normally in groups of one or more, at their centers have a non-circular opening and a plurality of spaced radial clearance notches corresponding to the projections on the spacers for assembly onto the spacer projections and for rotation therewith and at the same time preventing rotation of the discs relative to the spacers.

As an important feature, various means may be employed for establishing a non-rotative relation between the shaft and the corresponding spacers, such as a non-circular opening in the spacer and a corresponding non-circular shape upon the shaft. The spacers are locked upon the shaft for rotation therewith, and rotation of the spacers with respect to the shaft is prevented.

As another feature, each of the respective disc support projections upon its flat surface has applied thereto an adhesive so that, upon the complete assembly of the respective spacers and the cloth discs mounted thereon and the application of pressure, there is provided a unit cartridge wherein the respective spacers are axially secured together with the corresponding cloth discs non-rotatively mounted upon the projections of the spacers and anchored between the adjacent spacers against rotation relative to the spacers.

An important feature of the present invention includes the method of making a cloth roll cartridge for use in a cloth roll assembly.

Still another feature is a novel method of cleaning a vehicle tire with a rotary cloth roll assembly.

These and other features and objects will be seen from the following specification and claims in conjunction with the appended drawings.

THE DRAWINGS

FIG. 2 is a fragmentary longitudinal section of the present cloth roll assembly with a power driven shaft mounted upon a pair of bearings fragmentarily shown.

FIG. 3 is a fragmentary section taken in the direction of arrows 3—3 of FIG. 2.

FIG. 4 is a fragmentary elevational view of a non-woven cloth disc of a fibrous material having a central opening therethrough and a plurality of clearance notches.

FIG. 5 is an elevational view of one side of the spacer disc shown in FIG. 2.

FIG. 6 is an elevational view thereof.

FIG. 7 is a side elevational view of the other side of the spacer disc.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
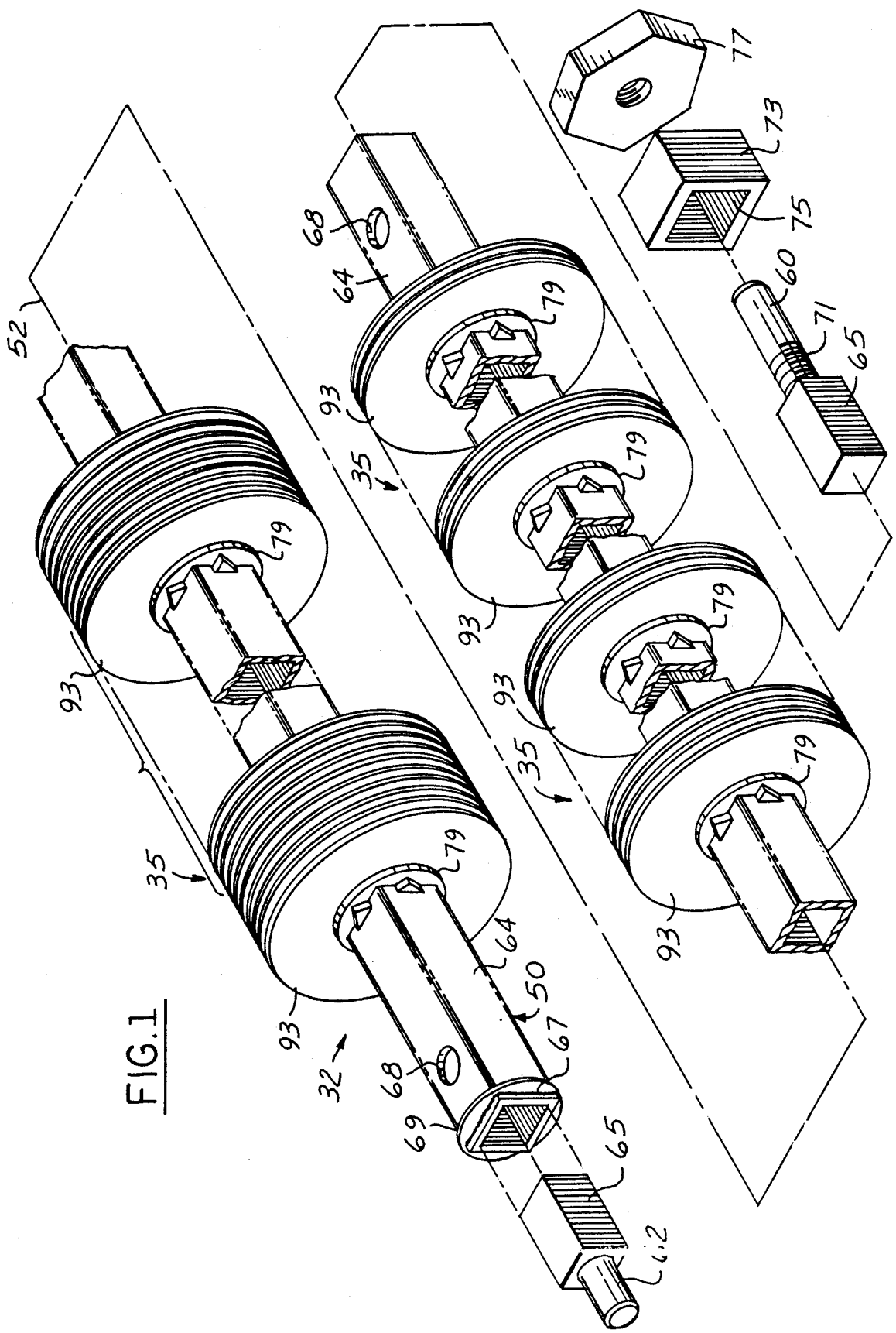
FIG. 1 is a perspective exploded view of a rotary cloth roll assembly including a series of replaceable cloth roll cartridges, fragmentarily shown.

Referring to the drawings FIGS. 1 and 2 the present rotary cloth roll assembly is generally indicated at 32 and is adapted for scrubbing and cleaning the sidewall of a rotating tire "T" fragmentarily shown in dash lines in FIG. 2. The tire is mounted on a vehicle and proceeds along a predetermined horizontal path of travel such as designated by an arrow "A" at the top of FIG. 2.

The present power rotated or rotary cloth roll assembly 32 at its ends is supported and journaled upon the longitudinally spaced bearings 33, fragmentarily shown, with the corresponding shaft 50 driven by a hydraulic motor 34 which is connected to the shaft along its longitudinal axis 52 as fragmentarily shown in FIG. 2. Motor 34 is connected to a source of hydraulic fluid, not shown, in a conventional manner. The actuation of the fluid motor 34 is effective to rotate the rotary cloth roll assembly 32. In the illustrative embodiment the unit shaft of the present rotary cloth roll assembly 32 is a tubular shaft 50 which is non-circular in cross-section, such as square or polygonal and includes a central longitudinal axis of rotation 52. The tubular shaft 50 includes an elongated intermediate portion 64 of non-circular cross section, such as square. Tubular shaft 50 further includes upon its axis of rotation 52 the respective shaft ends 60 and 62 journaled and supported within the bearings 33 fragmentarily shown. Each of the shaft ends 60 and 62 includes a shank 65 of square cross section which is projected into the corresponding square bore of the intermediate portion 64 of the shaft 50 and secured thereto as by the welds 67. The tubular shaft 50 is provided at each end with one or more openings 68 which overlie the shank 65. Spot welds 67 may be provided in the openings 68 to assist in securing the shanks 65 to the intermediate portion 64 of shaft 50, FIG. 2.

A positive abutment stop 69, in the form of a washer or the like is secured adjacent one end of the shaft 50 intermediate portion 64 as by the welds 67. Shaft end 60 includes a plurality of threads 71. The present rotary cloth roll assembly 32 includes a series of aligned unit cartridges 35, sometimes referred to as cloth roll cartridges, which are assembled and aligned onto the shaft intermediate portion 64 and bear against abutment stop 69. The spacer sleeve 73, sometimes referred to as a compression sleeve, in the illustrative embodiment has a square bore 75, FIG. 1, and is positioned over one end of the shaft 64 and retained thereon by the pair of fasteners or nuts 77, FIG. 2.

CARTRIDGE ASSEMBLY

Figure 9:
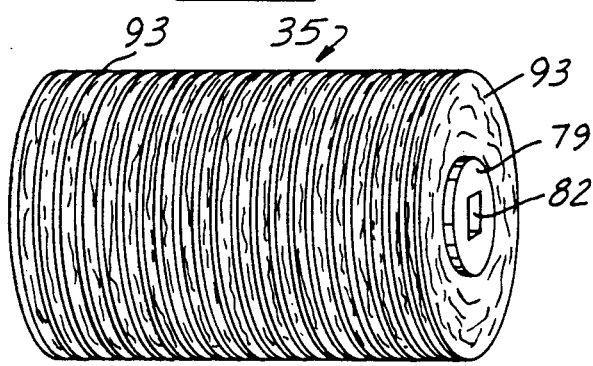
FIG. 9 is a front perspective view of a completed cartridge made in accordance with the present method.

Each of the respective unit cartridges 35, FIGS. 1, 2 and 9, includes a plurality of aligned engaging spacers 79 which are slidably positioned over the intermediate portion 64 of the shaft 50 with the first of the cartridges 35 bearing against the abutment stop 69. Each of the spacers 79 is constructed of a plastic material, such as ABS, though not limited thereto, and includes a body 80 arranged upon a central axis 81, FIGS. 5, 6 and 7 having a central opening 82 or bore arranged upon axis 81. In the illustrative embodiment, the opening 82 is polygonal or square, such as shown at 82, for cooperative registry with the square intermediate shaft portion 64. Spacer 79 has a first side 84 which is flat, FIG. 7 and a second side 86, FIG. 5, from which projects a plurality of spaced radially extending disc support and locating projections 88. Each of the disc support and locating projections 88 terminates in a flat surface 90 which is parallel to the first side 84 of the spacer 79. Each spacer 79 is symmetrical about the horizontal and vertical axes 83 and 85 as viewed in FIG. 5 and may be aligned in any one of four positions in the cartridge by placing the spacer over the mandrel 105 as will be described later.

Figure 8:
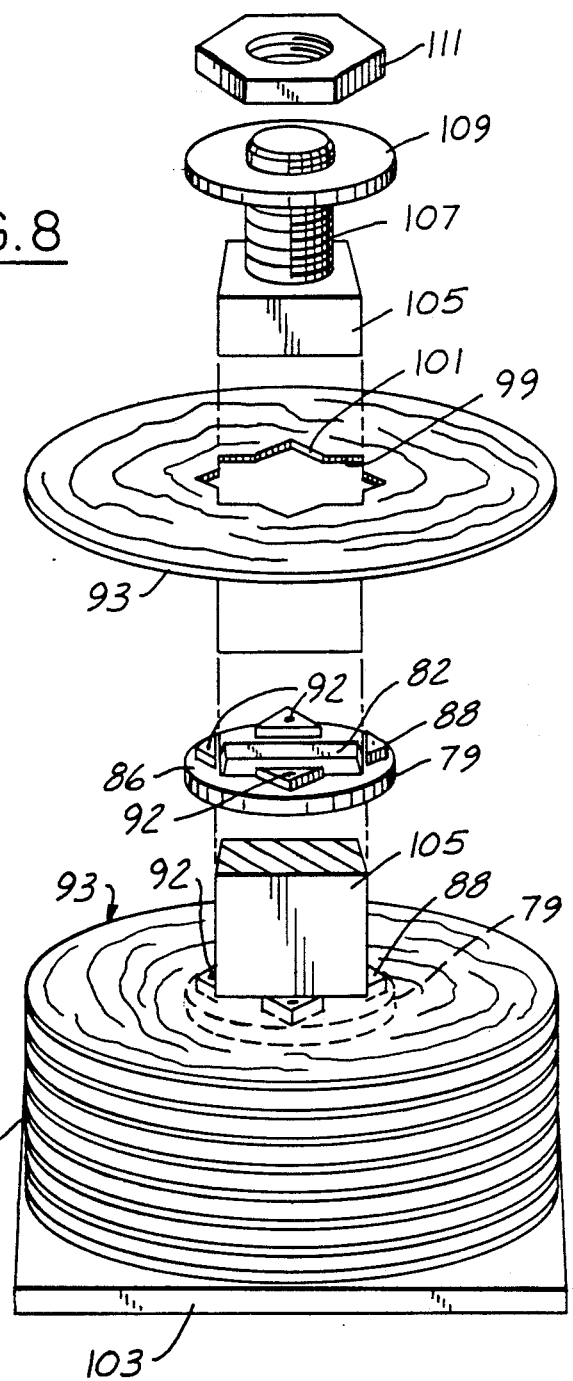
FIG. 8 is a fragmentary perspective view of the mandrel used in connection with the method of making the present rotary cloth roll cartridge.

In the illustrative embodiment and accordance with the present method of assembly of the respective cartridges 35 each of the respective and coplanar flat surfaces 90 of the disc support and locating projections 88 has applied thereto a layer of adhesive 92, FIG. 5, by which the respective discs 93 and spacers 79 upon assembly upon the mandrel 105, FIG. 8, will be secured together as a unit to complete the cloth roll assembly 35 of FIG. 9. As an example, each spacer has an outside diameter of 3¼ inches, a centrally located square opening of 2 inches on each side, and a thickness of ¼ inch approximately.

Mounted upon each of the respective spacers 79 is a flexible cloth like disc 93, shown fragmentarily in FIGS. 2, 3 and 4 constructed of a non-woven fibrous material. Each of the non-woven cloth discs 93 is constructed of a synthetic fiber for illustration and includes outer zone 95 and central inner zone 97, FIG. 3. Each disc includes a clearance opening 99, sometimes referred to as a shaft clearance opening, which includes intermediate the sides of the central opening 99 a plurality of spaced radially extending clearance notches 101. The notches 101 are generally of triangular shape in the illustrative embodiment. Such triangular shape of the notches 101 corresponds to the generally triangular shape of the disc support and locating projections 88, shown in FIG. 3, wherein the disc 93 at its central zone 97 is assembled over the respective corresponding projections 88. The respective clearance notches 101 together form a square opening similar to the clearance opening 99 within said discs and offset 45 degrees with respect thereto, FIG. 4. Cloth disc 93 is a synthetic non-woven synthetic needle punch product stamped from a non-woven synthetic fibrous material, as an example, polyester fibers, though not limited thereto.

METHOD OF MAKING A CLOTH ROLL CARTRIDGE

Referring to the apparatus shown in FIG. 8, a plurality of cartridges 35 as units are applied to the rotative shaft 50, FIGS. 1 and 2, with a single cartridge as a unit being shown in FIG. 9 after completion of the method of making such roll cartridge.

The present method of making a roll cartridge 35 includes the following steps:

a. Taking a plurality of spacers 79, each spacer having a body 80 of generally circular configuration, a flat first side 84 and a second side 86; there being an axially located opening 82 extending through the body between the first and second sides and wherein the second side has extending therefrom a plurality of spaced radially extending disc support and locating projections 88 with each projection terminating in a flat surface 90, FIG. 5;

b. Taking discs 93 of a flexible non-woven synthetic fibrous material and having a central opening 99 therein including a plurality of spaced radially extending clearance notches 101, FIG. 4;

c. Placing a spacer 79, with the first side 84 facing downwardly on an upstanding mandrel 105, FIG. 8, including a support base 103 and wherein the mandrel in the illustrative embodiment is non-circular in cross-section, such as square;

d. Placing one or a pair cloth discs 93 over the outwardly facing disc support and locating projections 88 of the preceding spacer 79 and wherein the corresponding spaced notches 101 within the flexible disc cooperatively received the correspondingly shaped projections 88 on the spacer;

e. Placing a layer of glue or adhesive 92 on each of the inwardly facing surfaces 90 of the spacer, FIG. 5;

f. Taking another spacer 79, FIGS. 5, 6 and 7, aligning the opening 82 thereof with the mandrel 105 and assembling said spacer onto the preceding spacer;

g. Repeating the steps of placing one or more discs 93 over the upstanding disc support projections 88 and placing a layer of glue at 92 upon the upper surfaces 90 thereof for the next disc and successively repeating the steps (c) through (f) until a stack of spacers 79 and discs 93 is at a predetermined height; and h. Applying pressure to the stack employing a washer 109 on the mandrel 105 over the last spacer 79 and assembling a nut 111 over the threaded end 107 of the mandrel 105 and tightening to apply axial pressure to the stack of discs 79 for cementing or securing the discs together and providing a unit roll cartridge 35 such as shown in FIG. 9. The height and length of the cartridge in the illustrative embodiment is 18 inches, and five such cartridges are used in the illustrative embodiment for the rotary cloth roll assembly 32 shown in FIGS. 1 and 2.

It is contemplated in use that the ultimate user of the present rotary cloth assembly 32, FIGS. 1 and 2, will have on hand in storage a series of cartridges 35 so that if a particular cartridge includes on or more discs that are worn or damaged, the entire cartridge 35 may be removed from the shaft 50 and replaced with a new cartridge such as shown at 35, FIG. 9.

While in the last filed copending application are disclosed the respective spacers as having rectangular mount shoulders thereon in order to supportably receive the corresponding cloth discs along the length of the shaft with the spacers mounted directly upon the shaft, in the current embodiment the respective spacers are arranged end to end and retained upon the shaft and with each spacer including upon one side thereof a plurality of spaced disc support and locating projections 88 adapted to be received within corresponding clearance notches 101 and the opening 99 within the respective discs 93 such as fragmentarily shown in FIG. 4.

The primary objective is to achieve a completed rotary cloth roll assembly 32 which is made up of a series of unit replaceable cartridges 35, FIGS. 1 and 2, which are assembled upon the rotary shaft 50 and retained thereon between the respective bearings 33 as shown in FIG. 2.

Each cartridge 35 may be packed and shipped in a carton which is easily lifted and transported.

The invention further includes the method of cleaning an automobile tire as illustrated in both of my copending patent applications such as the tire fragmentarily shown at "T" in FIG. 2 in dash lines. The tire proceeds along a predetermined horizontal path of travel generally indicated by the arrow "A" at the top of FIG. 2. The disclosures of my copending applications are incorporated herein by reference to the extent necessary for a clear understanding of the cleaning apparatus and method. The method of cleaning the automobile tire T comprises:

a. rotating an elongated cloth roll assembly 35 upon a longitudinal axis 52 relative to a vehicle tire T moveable along a path parallel to axis 52; and b. bringing the outer periphery of the cloth roll assembly 35 into operative lateral contact with side surfaces of the tire as it advances along the path to clean the side surfaces of the tire.

In the foregoing method the rotary cloth roll assembly 35 includes a shaft 50 rotatable upon axis 52 and mounting a series of aligned cloth roll cartridges 35 axially mounted upon and secured to shaft 50. As a part of the method of cleaning an automobile tire, each cartridge includes a series of spacers 79 mounted end to end upon shaft 50 and secured thereon for rotation therewith together with a plurality of non-woven cloth discs 93 respectively mounted upon the spacer 79 and secured thereto and with the spacers of each cartridge secured together along the length of the cartridge. With the aforementioned method, the outer periphery of the cloth discs is brought into operative lateral contact with the side surfaces of the tire for scrubbing and cleaning the sidewalls of the tires.

On example of the material used in making the discs 93 is a polyester fiber, though not limited thereto. The polyester fibrous material is provided with a polysaturant and has a dry weight of 32 ounces per yard, for illustration. Disc 93 has a diameter of eight inches, a thickness of 3/32 inches, approximately, a centrally located square opening of $2\frac{1}{4}$ inches on each side and with a distance of $2\frac{7}{8}$ inches between the opposing U-shaped notches 101.

Having described my invention, reference should now be had to the following claims, I claim:

1. A rotary cloth roll assembly for an automobile wash system for treating the surfaces of tires on one side of an automobile as it proceeds along a predetermined horizontal path of travel, comprising:

an elongated rotary shaft having a longitudinally extending axis adapted to be arranged parallel to the path of travel of the automobile, said shaft having a pair of end portions and an elongated intermediate portion having intersections with said end portions, said intermediate portion having a non-circular cross-section;

a positive stop abutment secured to said shaft near said intermediate portion and one of said end portions;

a series of engaging spacers mounted upon said intermediate portion with the first spacer bearing against said abutment;

each spacer having a center, a non-circular opening therein at said center generally conforming to said non-circular cross-section of said intermediate portion of said shaft for assembly upon the shaft along said axis and for rotation therewith;

each spacer having first and second sides, said first side being generally flat;

each second side having thereon and extending axially therefrom a plurality of spaced disc locating and supporting projections, each projection terminating in a flat surface parallel to said first side;

a series of flexible non-woven cloth discs of synthetic fibers, each disc having at its center a non-circular opening conforming to said non-circular cross-section of said intermediate portion of said shaft, said disc being received on said shaft, said discs having a plurality of communicating spaced radial clearance notches extending radially outwardly of said non-circular cross-section openings and conforming to the locating and supporting projections on a spacer, said clearance notches being received upon the projections of each spacer, respectively for rotation therewith, the combination preventing rotation of said cloth discs relative to said intermediate portion of said shaft and said spacers;

a layer of adhesive upon the flat surfaces of the support projections of each spacer engaging the first side of an adjacent spacer, for interconnecting adjacent spacers along their length; and fastening means on the other of said end portions of said shaft for securing the spacers to said abutment and to said shaft thereby retaining the flexible discs between said spacers.

2. In the cloth roll assembly of claim 1, further comprising the first of said cloth discs axially bearing against said positive stop abutment.

3. In the cloth roll assembly of claim 1, further comprising the intermediate portion of said shaft being of square cross-section; and the openings in said spacers being of square shape.

4. In the cloth roll assembly of claim 1, further comprising the intermediate portion of said shaft being a tube of polygonal cross-section;

the openings in said spacers being of a matching polygonal shape;

said end portions of said shaft including a pair of spaced aligned stud shafts within and projecting axially outward of the ends of said intermediate portion and welded thereto.

5. In the cloth roll assembly of claim 4, said stud shafts at their one ends having shanks of similar polygonal shape projected into the end of said intermediate portion.

6. In the cloth roll assembly of claim 1, further comprising said fastening means being removable and including threads provided on said one end portion adjacent said intermediate portion;

a compression sleeve with a pair of end surfaces upon one end of the intermediate portion of said shaft, with one end surface engaging the adjacent spacer; and a nut applied to said threads and engaging the other end surface of said sleeve, for securing the spacers on said shaft and against said abutment.

7. In the cloth roll assembly of claim 1, further comprising the locating and supporting projections upon each spacer being triangular, and the opening of each disc being square and including a plurality of triangular notches receiving said projections.

8. In the cloth roll assembly of claim 1, further comprising said shaft end portions being of circular cross-section.

9. In the cloth roll assembly of claim 1, further comprising said fibers being polyester fibers.

10. A rotary cloth roll assembly for an automobile wash system for treating the surfaces of the tires on one side of an automobile as it proceeds along a predetermined horizontal path of travel, comprising:

an elongated rotary shaft having a longitudinal axis parallel to the path of travel, said shaft having a pair of end portions and an elongated intermediate portion between the end portions, said intermediate portion having a non-circular cross-section;

a positive stop abutment secured to said shaft adjacent the intersection of said intermediate portion and one of said end portions;

a plurality of replaceable elongated unit cloth roll cartridges arranged end to end and mounted upon said shaft with their corresponding longitudinal axes in alignment, and with the first cartridge bearing against said positive stop abutment;

each of said unit cloth roll cartridges having a series of aligned coaxial engaging spacers, each spacer having a unitary body having a centrally extending axis, said body having first and second sides, the first side being generally flat, and a centrally located opening extending through the body along said axis between said sides;

said second side having thereon and extending therefrom a plurality of disc locating and support projections which are spaced radially outwardly of said axis and extend away from said second side, with each projection terminating in a generally flat surface parallel to said first side;

a plurality of flexible non-woven cloth discs of synthetic fibers, each disc having at its center a generally non-circular opening conforming to said non-circular cross-section of said intermediate portion of said shaft, said disc being received on said shaft, said discs having a plurality of spaced radial clearance notches extending radially outwardly of said non-circular cross-section openings and therein conforming to the projections of a spacer and assembled onto said projections respectively and secured thereon against rotation relative to said projections;

central portions of said cloth discs being interposed between said spacers;

a layer of adhesive upon the flat surfaces of said projections interposed between the projections of one disc and the opposing first sides of adjacent spacers and interconnecting adjacent spacers of each cartridge along their length;

said spacer openings being aligned and defining an axial bore through the cartridges and through which said shaft extends;

interlocking means between said cartridges and said shaft for rotation in unison and for preventing rotation of said cartridges relative to said shaft; and fastening means upon and adjacent the other of said end portions of said shaft retainingly engaging the adjacent cartridge for anchoring all of said cartridges relative to said stop abutment and with respect to said shaft for rotation therewith.

11. In the rotary cloth roll assembly of claim 10, further comprising said flexible non-woven cloth discs being arranged in groups of at least one disc, with each group being separated by a spacer to provide a cloth roll assembly of a generally uniform density.

12. In the rotary cloth roll assembly of claim 10, further comprising said flexible non-woven cloth discs being arranged in groups of at least one disc, with each group being separated by a spacer and mounted upon the projections of each spacer.

13. In the rotary cloth roll assembly of claim 10, further comprising said discs opening being of generally square configuration, said projections being generally triangular.

* * * * *